(12) United States Patent
Kuhn

(10) Patent No.: US 6,303,172 B1
(45) Date of Patent: Oct. 16, 2001

(54) METHOD OF TREATING COMMERCIAL GRADE PRODUCTS TO REMOVE UNDESIRABLE ODORS AND FLAVORS

(75) Inventor: Dale F. Kuhn, Shawnee Mission, KS (US)

(73) Assignee: Tillin, Inc., Shawnee Mission, KS (US)

( * ) Notice: Subject to any disclaimer, the term of this patent is extended or adjusted under 35 U.S.C. 154(b) by 0 days.

(21) Appl. No.: 09/670,253

(22) Filed: Sep. 26, 2000

Related U.S. Application Data

(63) Continuation-in-part of application No. 09/217,382, filed on Dec. 21, 1998, now Pat. No. 6,123,973, which is a continuation-in-part of application No. 08/725,006, filed on Oct. 1, 1996, now Pat. No. 5,858,447, which is a continuation-in-part of application No. 08/482,772, filed on Jun. 7, 1995, now abandoned, which is a continuation-in-part of application No. 08/363,716, filed on Dec. 23, 1994, now abandoned, which is a continuation-in-part of application No. 08/099,939, filed on Jul. 30, 1993, now abandoned.

(30) Foreign Application Priority Data

Jun. 1, 2000 (MX) ................................................. 005412

(51) Int. Cl.$^7$ ................................. A23L 3/34; A23P 1/00
(52) U.S. Cl. ........................... 426/532; 426/486; 426/487; 426/488; 426/330; 426/330.2; 426/334; 426/335; 514/974
(58) Field of Search ..................... 426/532, 486, 487, 488, 330, 330.2, 334, 335; 514/974

(56) References Cited

U.S. PATENT DOCUMENTS 246,975 * 9/1881 Philips .
5,858,447 * 1/1999 Kuhn .
6,123,973 * 9/2000 Kuhn .

FOREIGN PATENT DOCUMENTS 58-98043 * 6/1986 (JP) .

* cited by examiner

Primary Examiner—Anthony J. Weier
(74) Attorney, Agent, or Firm—Jeffrey L. Thompson; Thompson & Thompson, P.A.

(57) ABSTRACT

A method of treating antimicrobial products, dairy products, pharmaceutical products and other products having offensive tastes or odors to remove the off-odors and off-tastes from the products. The method involves exposing a selected commercial grade product that contains a small amount of free acid impurities to an ammonia gas. The ammonia gas reacts with the free acid impurities to convert the free acids into ammonium salts, thereby reducing or eliminating the off-flavor and off-odor of the product. The products to be treated include antimicrobial products selected from the group consisting of sodium benzoate, calcium benzoate, potassium benzoate, sodium diacetate, paraben, niacin, calcium acetate, calcium diacetate, sodium sorbate, calcium sorbate, potassium sorbate, sodium propionate, calcium propionate, potassium propionate and mixtures thereof; dairy products selected from the group consisting of casein, whey, skim milk powder, and calostrum; pharmaceutical products selected from the group consisting of acetaminiphen, aspirin, ibuprophen, dextromethorphan hydrobromide, guaejenesin, paracetamol, and sodium erythorbate; and various other products selected from the group consisting of butylate hydroxy tolulene, polydextrose powder, sodium acid sulfate, and sodium diacetate. The common characteristic of the commercial grades of each of these products is that they contain a small amount of free acid impurities that react favorably with ammonia gas.

29 Claims, 1 Drawing Sheet

US 6,303,172 B1

METHOD OF TREATING COMMERCIAL GRADE PRODUCTS TO REMOVE UNDESIRABLE ODORS AND FLAVORS

RELATED APPLICATIONS

This application is a continuation-in-part of U.S. application Ser. No. 09/217,382, filed on Dec. 21, 1998 (U.S. Pat. No. 6,123,973), which is a continuation-in-part of U.S. application Ser. No. 08/725,006, filed on Oct. 1, 1996 (now U.S. Pat. No. 5,858,447), which was a continuation-in-part of U.S. application Ser. No. 08/482,772 filed Jun. 7, 1995 (now abandoned), which was a continuation-in-part of U.S. application Ser. No. 08/363,716 filed Dec. 23, 1994 (now abandoned), which was a continuation-in-part of U.S. application Ser. No. 08/099,939 filed Jul. 30, 1993 (now abandoned), all of which are incorporated herein by reference. This application also claims the benefit under 35 U.S.C. 119 of Mexican Patent Application No. 5412 filed Jun. 1, 2000.

FIELD OF THE INVENTION

The present invention relates generally to methods of treating antimicrobial products, dairy products, pharmaceutical products, and other products having offensive odors or tastes to remove the off-odors and off-tastes from the products. The method involves exposing a selected commercial grade product containing a small amount of free acid impurities to an ammonia gas to convert the free acid impurities into ammonium salts, thereby eliminating the offensive odors and/or tastes caused by the free acids.

BACKGROUND OF THE INVENTION

The growth of mold, rope, yeasts and bacteria is a significant problem in packaged or processed foods such as dairy products, margarine, butter, baked goods, fruit and vegetable containing products such as fruit fillings for pies or pastries, and processed meats. The growth of mold, rope, yeasts and bacteria not only significantly reduces the useful shelf life of the product, thus increasing the sellers' direct costs due to stale or moldy products that cannot be sold, but also requires that certain items be refrigerated during shipping and/or at the marketplace, which causes additional indirect expenses for the end seller of the product.

Various food preservatives are on the market. However, when used at concentrations that effectively increase shelf life, the prior art food preservatives impart an off-flavor, odor, color and/or texture to the final product that is undesirable. Consequently, a need exists for a food preservative that increases the shelf life of the product while not requiring refrigeration or causing off-flavor, color, odor and/or texture.

Other products, such as dairy products and pharmaceutical products, also tend to have offensive flavors and odors that are undesirable for consumers. Thus, a need exists for a method of treating such products to remove the offensive odors and flavors without altering the primary composition and effectiveness of the products.

DESCRIPTION OF THE PRIOR ART

Calcium propionate and potassium sorbate are recognized mold inhibitors. U.S. Pat. Nos. 3,900,570 and 4,416,904 both disclose the use of calcium propionate, potassium sorbate and sodium benzoate at very low concentrations as optional mold inhibitors. For example, U.S. Pat. No. 3,900,570 discloses a maximum usage of calcium propionate of 0.25 parts by weight per 100 parts of flour in the finished dough, with the preferred range being about 0.06 to about 0.12 parts. In U.S. Pat. No. 4,416,904, similar concentrations are disclosed: 0.04% to 0.10% for sodium benzoate, 0.05% to 0.20% for sorbic acid, and 0.4% for calcium propionate.

The low concentrations of mold inhibitors used in prior art products are necessary due to the off-flavor, odor, taste and/or texture imparted by low levels of free acids that are present as impurities in the antimicrobial products, such as propionate or sorbate. These free acids are particularly noticeable when the concentration levels of the food preservatives are increased. Before the applicant's invention, no one had effectively prepared a food preservative that incorporates either a propionate or sorbate such that, when used at increased levels, it does not impart an undesirable off-flavor, odor, or texture.

U.S. Pat. No. 3,900,570 discloses a process for making yeast leavened bread using, among other things, a "fermentation adjuvant" containing an emulsifying agent, a yeast nutrient, an oxidizing agent such as azodicarbonamide, and a mold inhibitor such as calcium propionate or sodium propionate. The adjuvant is prepared by blending together the emulsifying agent, yeast nutrient, and oxidizing agent until the yeast nutrient and the oxidizing agent are encapsulated by the emulsifying agent. According to the teachings of U.S. Pat. No. 3,900,570, if a mold inhibitor is used, it is added only after the oxidizing agent is encapsulated by the emulsifying agent. The resulting adjuvant is then added to a bread dough, and the dough is cooked at a suitable temperature. U.S. Pat. No. 3,900,570 does not teach that gases, such as those derived from decomposing azodicarbonamide, can be reacted with a suitable mold inhibitor compound to remove the free acids from the compound and, thereby, cleanse the off-flavor and off-odor from the mold inhibitor compound.

U.S. Pat. No. 5,547,987 issued to Bland et al. discloses a pathogen inhibitor for animal feeds that uses a mixture of n-butyric acid and propionic acid, each of which is in an aqueous solution and contains a large amount of free acids. The aqueous solution of the acids is reacted with anhydrous ammonia by bubbling the ammonia gas therethrough. The anhydrous ammonia is added in a sufficient quantity to convert the acid mixture into ammonia salts until a buffered mixture is obtained with a neutral pH. The ammonia content in the final product of Bland et al., according to the examples given, is approximately 12.7 wt. %, which indicates that a large amount of free acid was contained in the acid mixture before ammonia was added, and also indicates that a substantial change in the composition and purity of the acid mixture occurred due to the addition of ammonia.

A need exists for a process that removes undesirable odors and flavors from antimicrobial products, dairy products, pharmaceutical products, and various other commercial grade products without causing a substantial change in the composition or purity of the products.

SUMMARY OF THE INVENTION

The present invention provides a novel process for treating a variety of products to remove the off-flavor and off-odor from the products. In most instances, the commercial grades of the products treated by the applicant's process contain a small amount of free acid impurities, which have been determined to be the cause of the offensive odors and/or flavors in the products. The free acids are converted by the applicant's process into less offensive ammonium salts.

The present invention has evolved through three phases of development, which will be referred to herein as the "inclusion" phase, the "separation" phase, and the "gas" phase of the invention. The applicant first developed the inclusion phase of the invention, which involved mixing azodicarbonamide with an antimicrobial compound and heating the mixture to cause a reaction between the two compounds. Next, the applicant developed the separation phase of the invention, which uses a separator means, such as a stainless steel mesh, to keep the azodicarbonamide separate from the antimicrobial compound. In the separation phase, the azodicarbonamide is heated to cause a reaction between the gases of the decomposing azodicarbonamide and the antimicrobial compound. Next, the applicant developed the gas phase of the invention, which involves reacting a gas, preferably ammonia gas or a mixture containing ammonia gas, with an antimicrobial compound to eliminate the free acids in the compound. The applicant next realized that the gas phase of the invention was also effective to neutralize odors and flavors in other products, such as dairy products, pharmaceuticals, and so forth. The present application is directed primarily to the gas phase of the invention, which will be described below in detail.

In each of the three phases of development of the present invention, an improved product is prepared by eliminating free acids that are present as impurities in the commercial grades of the product. Acids can exist either as a free acid or as one of their associated salts. For example, propanoic (propionic) acid can exist as, but is not limited to, one of the following salts: sodium propanoate, calcium propanoate, magnesium propanoate, potassium propanoate, and ammonium propanoate. The salts of these acids, however, have different properties, for example taste and odor, than do the free acids from which they were derived.

In the food industry, several salts of various acids are employed. Unfortunately, the commercial grades of these salts that are available to the food industry contain a small amount of the various free acids as impurities. These small amounts of free acid tend to impart undesirable tastes and/or odors to the product. The present invention offers an effective means of converting the residual free acids that may be present in the commercial grade salts into the ammonium salts by exposure to ammonia gas, thereby eliminating undesirable tastes and odors.

In the gas phase of the present invention, the product to be treated is mixed and reacted with ammonia gas to convert free acid impurities in the product into ammonium salts. The ammonia gas is removed from the final product using heat or vacuum. The resulting product has little or no off-flavor, off-texture, off-color or off-odor because the main source of such undesirable tastes and odors is eliminated by changing the free acid impurities into ammonium salts.

An important advantage of the applicant's process, particularly in the case of antimicrobial products for foodstuffs, is that the critical reaction between the gases and the treated product occurs before the resulting product is added to the foodstuff. This is significant because it permits the treated product to be prepared separately and then incorporated into foodstuffs or other products that are processed at relatively low temperatures, such as cheese and milk. For example, by exposing a commercial grade compound to ammonia gas to remove the free acid impurities before the compound is added to a foodstuff, the superior results of the present invention can be attained in foodstuffs, such as cheese and milk, which are never heated above 140° F., for example, and without exposing the foodstuff directly to the ammonia gas.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Figure 1:
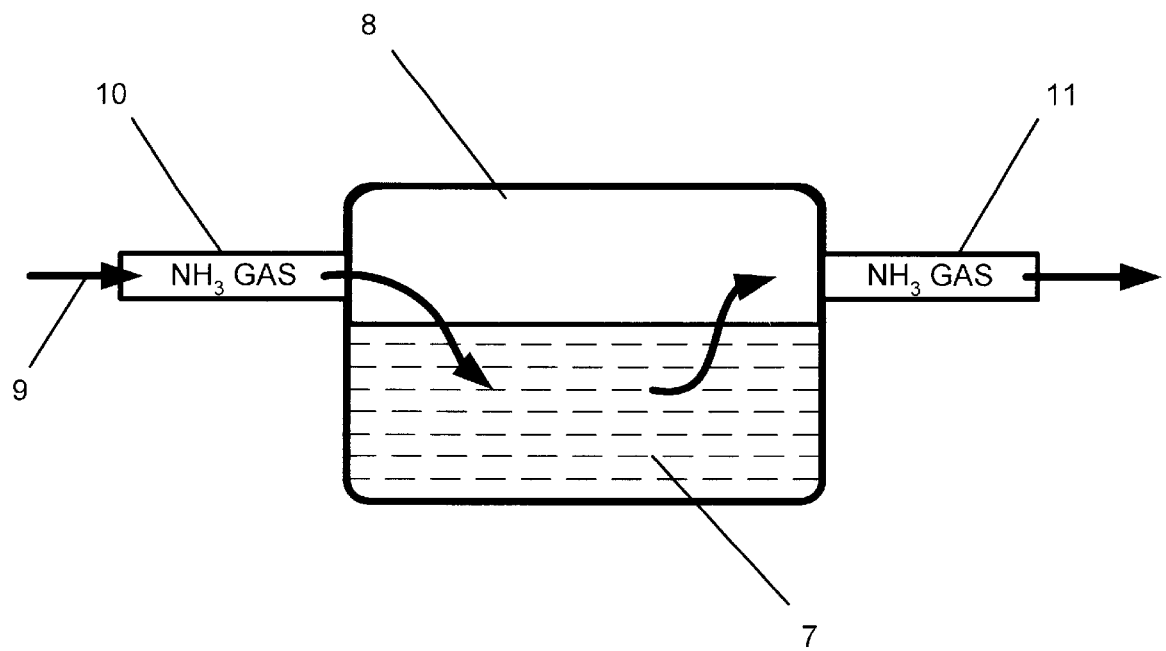
FIG. 1 is a diagram for illustrating the gas phase embodiment of the present invention.

The first, second, third and fourth embodiments of the applicant's invention were described in detail in the applicant's prior application and therefore will not be further described herein. The description of these embodiments in the prior application is incorporated herein by reference.

A detailed description of the preferred embodiments of the present invention is provided herein. It is, however, to be understood that the disclosed embodiments are merely illustrative of the invention, which may be embodied in various forms. Therefore, specific structural and functional details disclosed herein are not to be interpreted as limiting, but merely as a basis for the claims and as a representative basis for teaching one skilled in the art to employ the process of the present invention to treat appropriate products.

Referring to FIG. 1, the gas phase embodiment of the present invention will now be described. In the gas phase embodiment, the compound 7 to be treated is placed inside a gas-tight chamber 8. The chamber 8 can be any suitable gas-tight container capable of holding the compound 7 and allowing gases to mix and react with the compound 7. The chamber 8 preferably has a first conduit 10 in fluid communication with the chamber 8 to inject a gas 9 into the chamber 8, and a second conduit 11 in fluid communication with the chamber 8 to vacuum residual gases out of the chamber 8.

The compound 7 placed in the chamber 8 is preferably in a dry powder form and can be a salt of an organic acidic compound selected from the group consisting of sodium benzoate, calcium benzoate, potassium benzoate, sodium diacetate, paraben, niacin, calcium acetate, calcium diacetate, sodium sorbate, calcium sorbate, potassium sorbate, sodium propionate, calcium propionate, potassium propionate, and mixtures thereof. Alternatively, the compound 7 can be a dairy product selected from the group consisting of casein, whey, skim milk powder, and calostrum; a pharmaceutical product selected from the group consisting of acetaminiphen, aspirin, ibuprophen, dextromethorphan hydrobromide, guaejenesin, paracetamol, and sodium erythorbate; or various other products selected from the group consisting of butylate hydroxy tolulene, polydextrose powder, sodium acid sulfate, and sodium diacetate. The common characteristic of the commercial grades of each of these compounds is that they contain a small amount of free acid impurities that react favorably with ammonia gas.

After placing the compound 7 into the chamber 8, the compound 7 is then mixed with an ammonia gas 9 or mixture of gases containing ammonia gas, such as ammonia gas and air or a mixture of gases similar to that derived from decomposing azodicarbonamide. The compound 7 is exposed to the gas 9 for a sufficient time for a uniform exposure to achieve the desired result of creating a product that does not have an off-flavor, off-odor, off-color or off-texture, and that has substantially the same composition and purity as before the ammonia gas exposure. The time of exposure is dependent on the size of the chamber 8, the amount of compound 7 to be mixed with the gas 9, and the temperature and pressure within the chamber 8.

The total pressure of the ammonia gas plus any other gases, such as air, acting as diluents would normally be one atmosphere, primarily for operating convenience. The partial pressure of the ammonia gas would range from about 0.01 atmospheres to about 1.0 atmospheres. Mechanical blending is preferably carried out within the chamber 8 while the compound 7 is in contact with the ammonia gas 9 in order to expose all of the compound 7 to the ammonia gas 9 for a complete and efficient reaction. The reaction of the ammonia gas 9 with the compound 7 in the chamber 8 will be virtually instantaneous. The exposure time of the compound 7 to the ammonia gas 9 would normally be one minute or greater, but could be less since the reaction is very swift.

The excess ammonia gas 9 is removed from the compound 7 after the reaction time is completed by applying a vacuum to the vessel 8 of about 0.9 atmospheres to about 0.0001 atmospheres. Alternatively, the compound 7 can be heated to a sufficient temperature to aid in the removal of any excess ammonia gas 9 from the compound 7. It is contemplated that the excess ammonia gas will be piped from the vessel 8 through a conduit 11 to a tank where it will be captured and reused, for example, as an agricultural fertilizer.

EXAMPLE 1

A commercial grade sample of potassium sorbate was prepared using the gas phase technology of the present invention. Before treatment, the potassium sorbate had a 99.4% purity and a distinctive off-odor and off-taste. The potassium sorbate was placed in a gas-tight container at approximately room temperature. An ammonia gas was then injected into the container until the partial pressure of ammonia gas within the container was approximately 0.5 atmospheres. The container was then rotated several turns to cause the potassium sorbate sample to blend completely with the ammonia gas within the container. After approximately two minutes, the ammonia gas was removed from the container by applying a vacuum to the container of approximately 0.5 atmospheres for about five minutes. The resulting product had no detectable off-odor or off-taste. In tests conducted by the applicant, the potassium sorbate sample proved to be a highly effective antimicrobial product in wheat flour tortillas without imparting any off-odor or off-flavor to the tortillas.

Samples of calcium propionate, sodium propionate, calcium acetate and sodium benzoate were also prepared using the gas phase technology of the present invention. These samples were prepared in the same manner as explained above in working Example 1. The resulting products had no detectable off-odor or off-taste.

EXAMPLE 2

A commercial grade sample containing approximately 17% potassium sorbate and 83% calcium propionate was prepared using the gas phase technology of the present invention. This sample initially had a distinctive off-odor and off-taste. The sample was exposed to ammonia gas in the same manner described above in Example 1 to convert the free acids in the sample to ammonium salts. The resulting sample had no detectable off-odor or off-taste.

The sample was then used at the rate of approximately 1% by weight to treat flour tortilla dough prepared using the following recipe: 454 g flour, 45.4 g vegetable oil, 9.08 g double baking powder, 9.08 g salt, 191.08 g tap water at 110° F., 4.54 g yeast, 0.09 g sugar, and 3 g citric acid. A control batch of flour tortilla dough was prepared following this same recipe, without adding any antimicrobial compound. The dough from both the treated batch and the control batch was measured into 40 g balls, which were flattened and cooked on a hot griddle for approximately three minutes and then allowed to cool.

The pH of the dough and the cooked tortillas dissolved in water were taken for both batches. The untreated dough had a pH of 5.39, while the treated dough had a pH of 5.49. The untreated cooked tortilla had a pH of 5.23, while the treated cooked tortilla had a pH of 5.69. The tortillas were then placed in an environment chamber maintained at about 85° F. and monitored daily for signs of mold. The untreated tortillas had visible mold starting after seven days. The test was discontinued after 18 days, at which time there was no visible mold on the treated tortillas.

Several of the other products listed above were exposed to ammonia gas in preliminary tests to determine the effectiveness of the applicant's process in removing the offensive odors and tastes from the products. It was determined through such preliminary tests that the listed products will respond favorably to the applicant's process, and that variations in the commercial grades of the products may affect the ultimate benefits obtained with the applicant's process for each particular product.

While this invention has been described in relation to the preferred embodiments, it is to be understood that various modifications thereof will now be apparent to one skilled in the art upon reading this specification, and it is intended that all such modifications that fall within the scope of the following claims be covered by this application.

What is claimed is:

1. A method of removing undesirable odors and flavors from commercial grade products, comprising:
    selecting a commercial grade product that contains a small amount of free acid impurities; and
    exposing the selected product to an ammonia gas to convert the free acid impurities in the product into ammonium salts to thereby minimize undesirable flavors or odors of the product;
    wherein said product is selected from the group consisting of sodium benzoate, calcium benzoate, potassium benzoate, sodium diacetate, paraben, niacin, calcium acetate, calcium diacetate, sodium sorbate, calcium sorbate, potassium sorbate, sodium propionate, calcium propionate, potassium propionate and mixtures thereof.

2. The method of claim 1, wherein said product is selected from the group consisting of sodium sorbate, calcium sorbate, potassium sorbate, sodium propionate, calcium propionate, potassium propionate and mixtures thereof.

3. A method of removing undesirable odors and flavors from commercial grade products, comprising:
    selecting a commercial grade product that contains a small amount of free acid impurities; and
    exposing the selected product to an ammonia gas to convert the free acid impurities in the product into ammonium salts to thereby minimize undesirable flavors or odors of the product;
    wherein said product is selected from the group consisting of acetaminiphen, aspirin, ibuprophen, dextromethorphan hydrobromide, guaejenesin, paracetamol, sodium erythorbate, and mixtures thereof.

4. A method of removing undesirable odors and flavors from commercial grade products, comprising:
    selecting a commercial grade product that contains a small amount of free acid impurities; and exposing the selected product to an ammonia gas to convert the free acid impurities in the product into ammonium salts to thereby minimize undesirable flavors or odors of the product;

wherein said product is selected from the group consisting of casein, whey, skim milk, colostrum, and mixtures thereof.

5. A method of removing undesirable odors and flavors from commercial grade products, comprising:

selecting a commercial grade product that contains a small amount of free acid impurities; and exposing the selected product to an ammonia gas to convert the free acid impurities in the product into ammonium salts to thereby minimize undesirable flavors or odors of the product;

wherein said product is selected from the group consisting of butylate hydroxy tolulene, polydextrose powder, sodium acid sulfate, sodium diacetate, and mixtures thereof.

6. A method of removing undesirable odors and flavors from commercial grade products, comprising:

selecting a commercial grade product that contains a small amount of free acid impurities;

exposing the selected product to an ammonia gas to convert the free acid impurities in the product into ammonium salts to thereby minimize undesirable flavors or odors of the product; and applying a vacuum to said product, after exposing said product to said ammonia gas, to remove any residual ammonia gas remaining in said product.

7. The method of claim 6, wherein said step of applying a vacuum comprises applying a vacuum of 0.9 to 0.0001 atmospheres.

8. A method of removing undesirable odors and flavors from commercial grade products, comprising:

selecting a commercial grade product that contains a small amount of free acid impurities;

exposing the selected product to an ammonia gas to convert the free acid impurities in the product into ammonium salts to thereby minimize undesirable flavors or odors of the product; and mechanically blending said product while said product is being exposed to said ammonia gas.

9. A method of removing undesirable odors and flavors from commercial grade products, comprising:

selecting a commercial grade product that contains a small amount of free acid impurities; and exposing the selected product to an ammonia gas to convert the free acid impurities in the product into ammonium salts to thereby minimize undesirable flavors or odors of the product;

wherein said ammonia gas has a partial pressure of approximately 0.01 to 1.0 atmospheres while said product is exposed thereto.

10. The method of claim 1, further comprising the step of heating said product, after being exposed to said ammonia gas, to a temperature sufficient to aid in the removal of any residual ammonia gas remaining in said product.

11. The method of claim 1, wherein said product is for incorporation into foodstuffs, and said product is exposed to said ammonia gas before incorporating said product into a foodstuff, such that when said product is incorporated into a foodstuff in an amount sufficient to cause microbial growth inhibition it does not impart an undesirable flavor, odor, texture or color to the foodstuff.

12. A method of inhibiting microbial growth in foodstuffs including creating said foodstuffs by mixing raw ingredients for preparing said foodstuffs with an antimicrobial product prepared by the method according to claim 1.

13. The method of claim 1, wherein said product is placed in an airtight chamber and said ammonia gas is substantially uniformly mixed with said product to facilitate a reaction between said ammonia gas and the free acid impurities in said product.

14. The method of claim 1, wherein said selected product is in a dry powder form when exposed to said ammonia gas.

15. The method of claim 3, further comprising the step of applying a vacuum to said product, after exposing said product to said ammonia gas, to remove any residual ammonia gas remaining in said product.

16. The method of claim 3, further comprising the step of mechanically blending said product while said product is being exposed to said ammonia gas.

17. The method of claim 3, wherein said ammonia gas has a partial pressure of approximately 0.01 to 1.0 atmospheres while said product is exposed thereto.

18. The method of claim 3, further comprising the step of heating said product, after being exposed to said ammonia gas, to a temperature sufficient to aid in the removal of any residual ammonia gas remaining in said product.

19. The method of claim 3, wherein said product is placed in an airtight chamber and said ammonia gas is substantially uniformly mixed with said product to facilitate a reaction between said ammonia gas and the free acid impurities in said product.

20. The method of claim 4, further comprising the step of applying a vacuum to said product, after exposing said product to said ammonia gas, to remove any residual ammonia gas remaining in said product.

21. The method of claim 4, further comprising the step of mechanically blending said product while said product is being exposed to said ammonia gas.

22. The method of claim 4, wherein said ammonia gas has a partial pressure of approximately 0.01 to 1.0 atmospheres while said product is exposed thereto.

23. The method of claim 4, further comprising the step of heating said product, after being exposed to said ammonia gas, to a temperature sufficient to aid in the removal of any residual ammonia gas remaining in said product.

24. The method of claim 4, wherein said product is placed in an airtight chamber and said ammonia gas is substantially uniformly mixed with said product to facilitate a reaction between said ammonia gas and the free acid impurities in said product.

25. The method of claim 5, further comprising the step of applying a vacuum to said product, after exposing said product to said ammonia gas, to remove any residual ammonia gas remaining in said product.

26. The method of claim 5, further comprising the step of mechanically blending said product while said product is being exposed to said ammonia gas.

27. The method of claim 5, wherein said ammonia gas has a partial pressure of approximately 0.01 to 1.0 atmospheres while said product is exposed thereto.

28. The method of claim 5, further comprising the step of heating said product, after being exposed to said ammonia gas, to a temperature sufficient to aid in the removal of any residual ammonia gas remaining in said product.

29. The method of claim 5, wherein said product is placed in an airtight chamber and said ammonia gas is substantially uniformly mixed with said product to facilitate a reaction between said ammonia gas and the free acid impurities in said product.

* * * * *